US006503575B1

(12) United States Patent
Payne et al.

(10) Patent No.: US 6,503,575 B1
(45) Date of Patent: Jan. 7, 2003

(54) PROCESS FOR PRODUCING GRADED COATED ARTICLES

(75) Inventors: William A. Payne, Whitestown, IN (US); Michael W. Vickrey, Indianapolis, IN (US); Anthony J. Stavros, Carmel, IN (US)

(73) Assignee: Praxair S.T. Technology, INC., North Haven, CT (US)

( * ) Notice: Subject to any disclaimer, the term of this patent is extended or adjusted under 35 U.S.C. 154(b) by 0 days.

(21) Appl. No.: 09/576,439

(22) Filed: May 22, 2000

(51) Int. Cl.[7] .................................................. C23C 4/12
(52) U.S. Cl. ..................... 427/447; 427/449; 427/453; 427/454; 427/455; 427/456; 427/446
(58) Field of Search ................................ 427/446, 449, 427/453, 454, 455, 456, 447

(56) References Cited

U.S. PATENT DOCUMENTS 4,613,259 A * 9/1986 Packer et al. .................. 406/14
5,362,523 A 11/1994 Gorynin et al. ............. 427/446

FOREIGN PATENT DOCUMENTS

JP          9-263927      * 10/1997

OTHER PUBLICATIONS

Tucker, "Advanced Thermal Spray Deposition Techniques", in Handbook of Deposition Technologies for Films and Coatings, R. F. Bunshah, ed., 2nd Edition, Noyes Publications, Park Ridge, New Jersey (1994) pp 591–642 (no month date).
Tucker, "Thermal Spray Coatings", in Surface Engineering ASM Handbook, vol. 5, ASM International, Materials Park, Ohio (1994) pp 497–509 (no month date).
Tucker, "Thermal Spray Coatings", in Handbook of Thin Film Process Technology, Institute of Physics Publishing, Ltd., London (1995) (no month date).

* cited by examiner

Primary Examiner—Katherine A. Bareford
(74) Attorney, Agent, or Firm—Blake T. Biederman

(57) ABSTRACT

The invention relates to a novel thermal spray process for the deposition of coatings with a graded or layered composition and the coated articles produced thereby. More particularly, the invention relates to feeding mixtures of coating materials to a thermal spray device and continuously or intermittently changing the composition of the deposited coatings by changing the thermal spray operating parameters. The continuous or intermittent change in the composition of the coating material during deposition creates a graded or layered coating structure.

12 Claims, No Drawings

PROCESS FOR PRODUCING GRADED COATED ARTICLES

TECHNICAL FIELD

The invention relates to a novel thermal spray process for the deposition of coatings with a graded or layered composition on a substrate and the coated articles produced thereby. More particularly, the invention relates to feeding at least two coating materials to a thermal spray device and continuously or intermittently changing the composition of the deposited coatings by changing the thermal spray operating parameters. The change in the composition of the coating during deposition creates a graded or layered coating structure.

BACKGROUND ART

The family of thermal spray processes includes detonation gun deposition, high velocity oxy-fuel deposition and its variants such as high velocity air-fuel, plasma spray, flame spray, and electric wire arc spray. In most thermal coating processes metallic, ceramic, cermet, or some polymeric materials in powder, wire or rod form is heated to near or somewhat above its melting point and droplets of the material accelerated in a gas stream. The droplets are directed against the surface of a substrate to be coated where they adhere and flow into thin lamellar particles called splats. The coating is built up of multiple splats overlapping and interlocking. These processes and the coatings they produce have been described in detail in the following: "Advanced Thermal Spray Deposition Techniques", R. C. Tucker, Jr., in Handbook of Deposition Technologies for Films and Coatings, R. F. Bunshah, ed., Second Edition, Noyes Publications, Park Ridge, N.J., 1994, pp. 591 to 642; "Thermal Spray Coatings", R. C. Tucker, Jr. in Handbook of Thin Films Process Technology, Institute of Physics Publishing, Ltd., London, 1995; and "Thermal Spray Coatings", R. C. Tucker, Jr., in Surface Engineering ASM Handbook, Vol. 5, ASM International, Materials Park, Ohio, 1994, pp 497–509.

In virtually all of the thermal spray processes two of the most important parameters controlling the structure and properties of the coatings are the temperature and velocity of the individual particles as they impact on the surface to be coated. Of these, the temperature of the particles is of greatest importance relative to the present invention. The temperature the particles achieve during the deposition process is a function of a number of parameters including the temperature and enthalpy (heat content) of the process gases, the specific mechanisms of heat transfer to the particles, the composition and thermal properties of the particles, the size and shape distributions of the particles, the mass flow rate of the particles relative to the gas flow rate, and the time of transit of the particles. The velocity the particles achieve is a function of a number of parameters as well, and some of these are the same as those that affect the particle temperature including the composition, velocity and flow rate of the gases, the size and shape distributions of the particles, the mass injection rate and density of the particles. Thus the thermal gas dynamics characteristics of the thermal spray process determine the quality of the resulting coating.

In a typical detonation gun deposition process, a mixture of oxygen and a fuel such as acetylene along with a pulse of powder of the coating material is injected into a barrel, such as a barrel of about 25 mm in diameter and over a meter long. The gas mixture is detonated, and the detonation wave moving down the barrel heats the powder to near or somewhat above its melting point and accelerates it to a velocity of about 750 m/sec. The molten, or nearly molten droplets of material strike the surface of the substrate to be coated and flow into strongly bonded splats. After each detonation, the barrel is generally purged with an inert gas such as nitrogen, and the process repeated many times a second. Detonation gun coatings typically have a porosity of less than two volume percent with very high cohesive strength as well as very high bond strength to the substrate. In the Super D-Gun™ coating process, the gas mixture includes other fuel gases in addition to acetylene. As a result there is an increase in the volume of the detonation gas products which increases the pressure and hence greatly increases the gas velocity. This, in turn, increases the coating material particle velocity which may exceed 1000 m/sec. The increased particle velocity can result in an increase in coating bond strength, density, and an increase in coating compressive residual stress. In both the detonation gun and Super D-Gun coating processes, nitrogen or another inert gas can be added to the detonation gas mixture to control the temperature of the detonated gas mixture and hence the powder temperature. A number of parameters can be used to control both the particle temperature and velocity including the composition and flow rates of the gases into the gun.

In high velocity oxy-fuel and related coating processes, an oxygen, air or another source of oxygen is used to burn a fuel such as hydrogen, propane, propylene, acetylene or kerosene in a combustion chamber and the gaseous combustion products allowed to expand through a nozzle. The gas velocity may be supersonic. Powdered coating material is injected into the nozzle and heated to near or above its melting point and accelerated to a relatively high velocity, such as up to about 600 m/sec. for some coating systems. The temperature and velocity of the gas stream through the nozzle, and ultimately the powder particles, can be controlled by varying the composition and flow rate of the gases or liquids into the gun. The molten particles impinge on the surface to be coated and flow into fairly densely packed splats that are well bonded to the substrate and each other.

In the plasma spray coating process a gas is partially ionized by an electric arc as it flows around a tungsten cathode and through a relatively short converging and diverging nozzle. The partially ionized gas, or gas plasma, is usually based on argon, but may contain, for example, hydrogen, nitrogen, or helium. The temperature of the plasma at its core may exceed 30,000 K and the velocity of the gas may be supersonic. Coating material, usually in the form of powder, is injected into the gas plasma and is heated to near or above its melting point and accelerated to a velocity that may reach about 600 m/sec. The rate of heat transfer to the coating material and the ultimate temperature of the coating material are a function of the flow rate and composition of the gas plasma as well as the torch design and powder injection technique. The molten particles are projected against the surface to be coated forming adherent splats.

In the flame spray coating process, oxygen and a fuel such as acetylene are combusted in a torch. Powder, wire or rod is injected into the flame where it is melted and accelerated. Particle velocities may reach about 300 m/sec. The maximum temperature of the gas and ultimately the coating material is a function of the flow rate and composition of the gases used and the torch design. Again, the molten particles are projected against the surface to be coated forming adherent splats.

Thermal spray coating processes have been used for many years to deposit layered coatings. These coatings consist of discrete layers of different composition and properties. For example, the coating may be a simple duplex coating consisting of a layer of a metal alloy such as nickel-20 chromium (compositions herein are in weight percent unless otherwise noted) adjacent to the substrate with a layer of zirconia over it. In this case the undercoat of nickel-chromium may be used to enhance the mechanical or thermal shock resistance of the coating system or to protect the substrate from corrosion. An increase in mechanical or thermal shock resistance may be achieved by adding a third layer of coating consisting of a mixture of nickel-chromium and zirconia between the pure nickel-chromium and zirconia layers. Alternatively, perhaps even better thermal or mechanical shock resistance could be achieved by using two or more intermediate layers, each with an increasing amount of zirconia, thus approximating a continuously graded structure. Recently some graded coatings have been referred to as "functionally graded" coating systems.

Prior to the present invention the general means of creating graded coating structures was to intermittently change the powder, wire or rod coating material composition being fed to the thermal spray device or devices if more than one was used to deposit the various layers. The coating deposition parameters and in some cases the coating thermal spray device were changed with each layer to obtain the desired coating structure of the particular layer composition. In most cases this meant that the coating process had to be stopped; the powder, wire, or rod feeders and composition changed; the deposition parameters such as electrical power, gas flows, and gas compositions changed; the process restarted; and new coating qualified before the coating of the substrate could be continued. All of this added very substantial time and cost to the coating process. Moreover, the time between coating layers generally tends to decrease the bond strength between layers and the over-all strength of the coating system.

It is an object of the present invention to provide a novel process for the production of thermal spray coatings that are graded in composition and/or properties.

It is a further object of the present invention to provide novel coatings that are graded in composition and/or density properties produced by the said novel process.

It is also a further object of the present invention to provide articles with graded coatings produced using the novel process of the invention.

It is a further object of this invention to provide a process for the deposition of graded coatings with greater cohesive strength than can be achieved using the multiple layer coatings of the present art.

It is also a further object of this invention to provide graded coatings with greater cohesive strength than that of the graded coatings of the present art. The higher cohesive strength of the coatings of this invention is believed to be the result of the smoother transition in composition and properties achieved with the process of this invention and the minimal time between the deposition of the layers of the coating.

SUMMARY OF THE INVENTION

The invention relates to a process for producing a graded thermal spray coated layer on a substrate comprising the feeding of a mixture of at least two coating materials to a thermal spray device and varying at least one of the deposition parameters of the thermal spray device during the deposition operating thereby varying the composition of the deposited coating material to produce a graded coated heterogeneous layer on the substrate. The thermal spray device for the process of this invention has parameters that can control or monitor the temperature of the depositing coating material and the velocity of the coating material particles.

The invention also relates to the deposition by means of the novel coating process of this invention, of unique coating structures with smoothly varying gradations in composition and/or density properties. Since the changes in deposition parameters can be made while the coating is being continuously deposited, the gradation or changes in composition and/or density properties are very smooth. If the coating is being continuously deposited, the gradation or changes in composition and properties are very smooth. If the coating is deposited without moving the gun or torch and the substrate is stationary as well, the coating gradation will be continuous; i.e., without discrete changes as a function of thickness. In most cases, however, the coating device and substrate can be moved relative to each other and the coating is deposited in multiple layers. Using the process of this invention, each layer may be slightly different than the preceding or succeeding layer. The time between layers is only dependent on the size of the substrate and the traverse rate (the relative rate of motion between the coating device and the substrate), since coating is being deposited continuously by the coating device. The difference between layers is a function of the rate of change in deposition parameters and the traverse rate. The smoothness of the gradation is then a function of the thickness of the individual layers which can be made very thin. The total thickness of the coating and of each zone is a function of the requirements of the application. The total thickness of the coating is typically in the range of 100 to 500 microns, but may be thicker or thinner if it is necessary to satisfy the specific requirements of the application.

This invention also relates to articles with the graded coatings of this invention. Such articles include those requiring coatings with graded properties to enhance the coating's mechanical, thermal, or electrical properties. As illustrative, but not limited, examples of these coated articles include (a) those that require a very hard, brittle surface such as an oxide or carbide graded to a tough, ductile metallic layer adjacent to the substrate to provide more impact resistance and higher bond strength of the coating to the substrate; (b) those that require a thermal barrier outer layer such as an oxide graded to a metallic layer adjacent to the substrate that provides oxidation resistance and thermal shock resistance; and (c) those that require a wear and corrosion resistant outer surface graded to an oxide layer adjacent to the substrate for electrical resistance.

As used herein, a graded coated layer shall mean at least one layer comprising a mixture of at least two coating materials in which at least one of the coating materials varies in composition to produce a heterogeneous coated layer. Also as used herein, composition of the coating material shall also include density of the coating material.

Graded coatings, as defined herein, are used extensively to enhance the mechanical impact resistance, thermal shock resistance, and corrosion resistance of a coating system, as well as for other purposes. Occasionally graded coatings are used to allow thicker coatings to be deposited than would otherwise be possible. Most commonly, the layer of coating next to the substrate is a metallic alloy, and the outermost coating layer is an oxide or cermet. The metallic layer bonds better to the substrate and the oxide or cermet than the cermet or oxide directly to the substrate. It also may improve the mechanical impact resistance and other properties of the total coating by providing a layer of intermediate mechanical properties such as elastic modulus. Other factors such as stress relief through creep of the metallic layer may also be important. An example of this type of system is the use of a nickel based alloy under a tungsten carbide cobalt coating used to repair worn machine components. The thermal shock resistance of a coated system may also be increased with a metallic intermediate layer by increasing the bond strength of the system and providing an intermittent coefficient of thermal expansion between a metallic substrate and an oxide outer coating. This type of coating is frequently used in thermal barrier coating system where the metallic alloy undercoat is also used to protect the substrate from oxidation or other forms of corrosion. A typical example of a thermal barrier coating system, such as aircraft components such as aircraft blades, uses a cobalt-nickel-chromium-aluminum-yttrium metallic alloy undercoat and a zirconia-yttria outer coating. The porosity inherent in the metallic coating is sealed by heat treatment after deposition to provide a corrosion resistant barrier to protect the substrate, frequently a superalloy turbine blade or vane in a gas turbine engine.

In accordance with this invention the properties of many graded coating systems can be improved by increasing the number of layers of coatings with increasing amounts of the material of the final outer layer. This results in a smoother transition in properties as the number of layers increases.

The invention relates to a novel thermal spray process in which a mixture of coating materials is fed to a thermal spray gun or torch and the rate of deposition of the individual components of the mixture varied in a controlled manner by varying the thermal parameters of the thermal spray process gases. As a simple, but not limited example, consider a coating material that consists of two components, A and B, with different properties including melting point, size, shape, heat capacity, and thermal absorption characteristics. The thermal spray deposition parameters may be initially set to optimize the deposition rate or efficiency of A and not B and then changed gradually to optimize the deposition rate or efficiency of B. Thus the deposited coating would have a gradation in composition from predominantly A to A+B to predominately B. In addition to gradations in composition, gradations in other properties such as density can also be made by changing the deposition parameters. While this invention includes coatings that are continuously graded in composition and properties it also includes coatings in which one or more layers of the coating is maintained constant for a given thickness. Any and all of these variations in gradations will be encompassed in the term "graded" as used herein. The coating material is usually fed to the thermal spray device in the form of powder, although one or more of the constituents could be fed in the form of wire or rod. When two or more of the constituents of the coating material are in the form of powder they may be blended mechanically and fed from a single powder dispenser to the thermal spray device or fed individually or in partial blends from two or more powder dispensers to the thermal spray device. The coating material may be fed to the thermal spray device internally as in most detonation gun and high velocity oxy-fuel devices or externally as in many plasma spray devices. The changes in deposition parameters including gas composition and flow rates, power levels, and coating material injection rates may be changed during the deposition process either manually by the equipment operator or automatically by computer control.

DETAILED DESCRIPTION

This invention comprises the process for depositing a graded coating using a thermal spray coating process in which a mixture of two or more powders is fed to the thermal spray device and the deposition parameters of the device are changed continuously or discontinuously. The result is that the deposition rate or efficiency of one or the powder constituents is initially dominant and, as the operating parameters are changed, the deposition rate of another constituent more or less gradually becomes dominant. An example, not intended to be limiting, is the deposition of a mixture of two materials with differing melting points such as a metallic alloy or an oxide. If a coating with a gradation from a metal layer next to the substrate to an oxide layer on the external surface of the coating is required, the operating parameters of the device would be initially set to provide a relatively low thermal content in the gas stream, sufficient to melt or nearly melt the metallic powder, but not the oxide. Under these conditions, the deposition rate of the metal would be very high while that of the oxide would be very low or nearly nil. The deposition parameters of the thermal spray device would then be changed to increase the thermal content of the gas stream so that more and more of the oxide would be heated to near or above its melting point. This would increase the deposition rate of the oxide and the coating composition would have a higher and higher fraction of oxide. As the thermal content of the gas stream increased to a sufficiently high level, the deposition rate of the metal would decline due to vaporization of the metal or due to the superheating of the particles to such a degree that they would splatter on impact rather than adhere to the surface being coated. The resulting coating may thus have a continuous gradation in composition from almost pure metal to almost pure oxide. If it were desired to have a constant composition for some portion of the thickness of the coating, the deposition parameters of the thermal spray device could be held constant for a period of time. Thus, continuing with the example of the metal-to-oxide coating, it would be possible to have a virtually pure metallic layer of some thickness adjacent to the substrate, followed by a graded zone, followed by a virtually pure oxide layer. This example could be used to produce a superior thermal barrier coating.

In those situations in which the thermal spray device is a detonation gun, the thermal content of the gas stream in the gun, as well as the velocity of the gas stream, can be varied by changing the composition of the gas mixtures. Both the fuel gas composition and the ratio of fuel to oxidant can be varied. The oxidant is usually oxygen. In the case of detonation gun deposition, the fuel is usually acetylene. In the case of Super D-Gun deposition, the fuel is usually a mixture of acetylene and another fuel such as propylene. The thermal content can be reduced by adding a neutral gas such as nitrogen.

In those situations in which the thermal spray device is a high velocity oxy-fuel torch or gun, the thermal content and velocity of the gas stream from the torch or gun can be varied by changing the composition of the fuel and the oxidant. The fuel may be a gas or liquid as described above. The oxidant is usually oxygen gas, but may be air or another oxidant.

In those situations in which the thermal spray device is a plasma spray torch, the thermal content of the plasma gas stream can be varied by changing the electrical power level, gas flow rates, or gas composition. As described above, argon is usually the base gas, but hydrogen, nitrogen, and helium are frequently added. Some plasma spray devices use liquid water rather than a gas to create the plasma stream. The velocity of the plasma gas stream can also be varied by changing the same parameters.

Variations in gas stream velocity from the thermal spray device can result in variations in particle velocities and hence dwell time of the particle in flight. This affects the time the particle can be heated and accelerated and, hence, its maximum temperature and velocity. Dwell time is also affected by the distance the particle travels between the torch or gun and the surface to be coated.

The specific deposition parameters used with any of the thermal spray devices depend on both the characteristics of the device and the materials being deposited. The rate of change or the length of time the parameters are held constant are a function of both the required coating composition gradation, the rate of traverse of the gun or torch relative to the surface being coated, and the size of the part. Thus a relatively slow rate of change when coating a large part may be the equivalent of a relatively large rate of change when coating a small part.

This invention also comprises graded coatings made by the process of this invention. These coatings have two or more constituents. The coatings of this invention include, but are not limited to, coatings that are virtually continuously graded from the composition of one constituent in the powder mixture to that of another constituent and also coatings graded from one constituent to another with zones of virtually constant composition for a given thickness. The gradation may have a very sharp transition zone such that the coating's composition changes from A to B with little discernable intermediate mixed zone. Alternatively, the transition may be very gradual from A to A+B to B with the A+B zone gradually changing from predominately A to predominantly B. More than two constituents may be included in the gradations. Thus, the gradation may be from A to B to C or may be from A to B+C, or from A to A+B to B+C, etc. In addition to gradations in composition, gradations in properties such as density can be made by changing the deposition parameters, either simultaneously while changing composition or independently while holding the composition constant for a given thickness of the coating.

The coatings of this invention may consist of metallic, ceramic, cermet, or polymeric materials, alloys thereof, or any combination of these. The coatings of this invention may be used for a wide variety of purposes including, but not limited to, wear resistance, corrosion resistance, thermal characteristics, mechanical characteristics, optical characteristics, or electrical characteristics or for any combination of these. A few examples, not intended to be limited in any way, include their use in the following ways: (a) as wear resistant surfaces where the gradation in properties may be from a metallic zone adjacent to a metallic substrate to hard wear resistant cermet composition on the exterior surface with the metallic zone and gradation serving to increase bond strength and ameliorate the mechanical stresses imposed in the coating in service; (b) as thermal barriers where the coating is graded from a zone of metallic coatings adjacent to the metallic substrate to an oxide with low thermal conductivity where the metallic layer provides corrosion protection and better bond strength and the gradation provides better thermal shock resistance; or (c) as electrically insulated and wear resistant coatings where the composition of the coating adjacent to a metallic substrate is an electrical insulator and the gradation is to a more wear resistant cermet surface where the gradation provides better bond strength and ameliorates thermal stresses placed on the coating in service.

The coated articles of this invention comprise those articles having a graded coating produced using the process of this invention. Said articles may include a very wide variety of components of manufacturing equipment or end products of production. A few examples intended to illustrate such articles, but not to be limiting in any way, include the following: (a) components requiring wear resistance in service that includes high mechanical loading where the coating may include a gradation from a relative tough, but ductile, metallic zone adjacent to a metallic substrate to a wear resistant cermet exterior zone with the gradation providing better bond strength and dissipation of the mechanical stresses placed on the coating's surface; (b) components requiring a thermal barrier to protect them from excessive heat or thermal shock or to increase the thermal efficiency of a process where the coating is graded from a metallic to an oxide as noticed above; or (c) components requiring electrical insulation with either the insulating layer being adjacent to the substrate with gradation to a more wear resistant surface as noted above or where the coating is graded from a metallic adjacent to substrate with gradation to an insulating oxide on the exterior surface with the gradation providing better bond strength and amelioration of imposed thermal or mechanical stresses.

EXAMPLE

A wear and corrosion resistant coating consisting of chromium carbide plus a nickel-chromium alloy known as nichrome that was electrically isolated from a metallic substrate that would also withstand thermal shock was required. An intermediate layer of alumina was chosen for the electrical isolation. Repeated attempts to apply the two materials as individual layers according to the prior art via detonation gun deposition were unsuccessful. The chromium carbide plus nichrome coating either would not adhere properly or would spall during testing. The introduction of an intermediate layer of a mixture of alumina plus chromium carbide/nichrome to form a graded coating according to the prior art was similarly unsuccessful. Surprisingly, a coating that consisted of a first zone adjacent to the substrate of virtually pure alumina, a second zone of alumina plus chromium carbide plus nichrome, and a third zone of chromium carbide plus nichrome deposited using the process of the present invention was very successful. A detonation gun made by Praxair Surface Technologies, Inc. was used to produce the graded coating of this invention. The powder mixture used consisted of 50 volume percent pure alumina blended with a previously mechanically blended mixture of 80 weight percent $Cr_3C_2$ plus 20 weight percent of nichrome (an alloy of 80 weight percent nickel plus 20 weight percent chromium). The particle sizes of the constituents were:

Alumina—5 to 44 microns

Chromium carbide—5 to 44 microns, and

Nichrome—5 to 53 microns The deposition parameters for each of the zones were:

|  | First Zone | Second Zone | Third Zone |
| --- | --- | --- | --- |
| Acetylene | 4.60 | 3.59 | 2.20 |
| Oxygen | 6.50 | 4.66 | 2.53 |
| Nitrogen | 0.00 | 2.75 | 6.27 |
| Total gas flow, cfm | 11.10 | 11.00 | 11.00 |
| Oxygen/carbon ratio | 1.41 | 1.30 | 1.15 |
| Nitrogen dilution, % | 0.00 | 25.00 | 57.00 |

The thickness of the zones of the coating were, in microns:

| First Zone | Second Zone | Third Zone |
| --- | --- | --- |
| 73.5 to 85.8 | 112.5 to 147 | 122.5 to 147 |

The high oxygen to carbon ratio and no dilution result in a very high detonation temperature and thermal content in the gas stream for the first zone. Thus a very high deposition rate or efficiency for the alumina constituent and very low or nil deposition rate or efficiency for the other constituents were achieved. The intermediate oxygen to carbon ratio and 25% nitrogen dilution resulted in an intermediate gas temperature and heat content for the second zone yield. Thus approximately equal rates of deposition or affiances for the alumina and the combination of chromium carbide plus chrome were achieved. The relatively low oxygen to carbon ratio and high (57%) nitrogen dilution resulted in a low gas stream temperature and low heat content. Thus a low deposition rate or efficiency for the alumina was achieved and a predominantly chromium carbide plus nichrome zone was created. This coating exhibited very high coherent strength and withstood testing of the coating in thermal shock.

Those skilled in the art can readily find many and widely varying uses for the unique and surprising useful processes, coatings, and coated articles of this invention. As many possible embodiments of this invention may be made without departing from the scope of the invention, it is understood that all matter set forth herein is to be interpreted as illustrative and in no way limiting.

What is claimed is:

1. A process for producing a graded thermal spray coated layer on a substrate comprising the feeding of a mixture of at least two coating materials to a thermal spray device, depositing the at least two coating materials on the substrate and varying at least one of the temperature and velocity parameters of the thermal spray device during the depositing of the at least two coating materials on the substrate to manipulate the at least two coating materials in the thermal spray device and to produce a graded coated layer on the substrate, the graded coated layer having a varying proportion of the at least two coating materials.

2. The process of claim 1 wherein the at least two coating materials are heated to about a melting point of the at least two coating materials to form droplets of the at least two coating materials and accelerating the droplets in a gas flow stream to contact the substrate.

3. The process of claim 2 wherein temperature parameters of the at least two coating materials can be varied with at least one function selected from the group consisting of temperature and enthalpy of a gas stream; size and shape distributions of droplets; mass flow rate of droplets relative to a gas flow rate; and time of transit of droplets to the substrate.

4. The process of claim 2 wherein velocity parameters of the at least two coating materials can be varied with at least one function selected from the group consisting of gas flow rate; size and shape distribution of droplets; and mass injection rate and density of droplets.

5. The process of claim 4 wherein temperature parameters of the at least two coating materials can be varied with at least one function selected from the group consisting of temperature and enthalpy of a gas stream; size and shape distributions of droplets; mass flow rate of droplets relative to a gas flow rate; and time of transit of droplets to the substrate.

6. The process of claim 1 wherein the thermal spray device is selected from the group consisting of detonation gun; high velocity oxy-fuel device; plasma spray device; and electric wire arc spray device.

7. The process of claim 6 wherein the thermal spray device is a detonation gun and said detonation gun uses a fuel composed of acetylene and at least one other fuel gas.

8. The process of claim 6 wherein the at least two coating materials are heated to about a melting point of the at least two coating materials to form droplets of the at least two coating materials and accelerating the droplets in a gas flow stream to contact the substrate.

9. The process of claim 8 wherein temperature parameters of the at least two coating materials can be varied with at least one function selected from the group consisting of temperature and enthalpy of a gas stream; size and shape distributions of droplets; mass flow rate of droplets relative to a gas flow rate; and time of transit of droplets to the substrate.

10. The process of claim 1 wherein the at least two materials fed to the thermal spray device are selected from the group consisting of metallic, ceramic, cermet, polymeric materials and alloys thereof.

11. The process of claim 1 wherein the at least two materials fed to the thermal spray device are in a form selected from the group consisting of powder, wire and rod and combinations thereof.

12. The process of claim 11 wherein the at least two materials fed to the thermal spray device are in powder form.

* * * * *